A. FISHER.
WASTE PIPE CONNECTION.
APPLICATION FILED MAY 5, 1910.

990,646.

Patented Apr. 25, 1911.

Witnesses.
Harry Davis
P. Shee

Inventor.
Alexander Fisher
By
Atty.

UNITED STATES PATENT OFFICE.

ALEXANDER FISHER, OF MONTREAL, QUEBEC, CANADA.

WASTE-PIPE CONNECTION.

990,646.

Specification of Letters Patent.   Patented Apr. 25, 1911.

Application filed May 5, 1910.   Serial No. 559,533.

*To all whom it may concern:*

Be it known that I, ALEXANDER FISHER, resident of 97 Shannon street, in the city and district of Montreal, in the Province of Quebec, in the Dominion of Canada, a subject of the King of Great Britain, have invented certain new and useful Improvements in Waste-Pipe Connections; and I do hereby declare that the following is a full, clear, and exact description of the same.

The invention relates to improvements in waste pipe connections as described in the present specification and illustrated in the accompanying drawings that form part of the same.

The invention consists essentially in the novel construction and arrangement of parts, whereby the flanged connecting piece extends inwardly into an annular recess in the flange of the pipe and is secured therein by a suitable filling substance.

The objects of the invention are to obviate the necessity of securing the connecting flange of the pipe to the flooring by screws, bolts or other means, to provide a good tight connection in passage for the waste matter and generally to devise a construction which adds to convenience in using, without materially adding to the cost of production.

Figure 1:
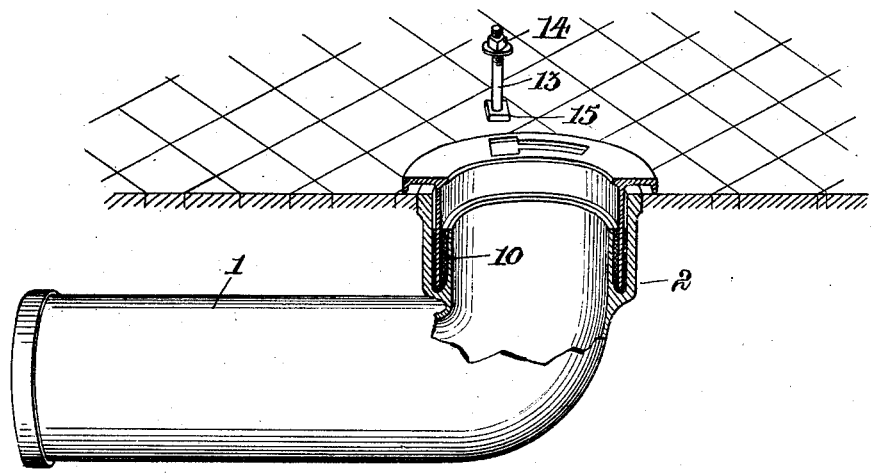
Figure 3:
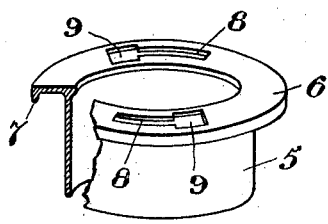
Figure 2:
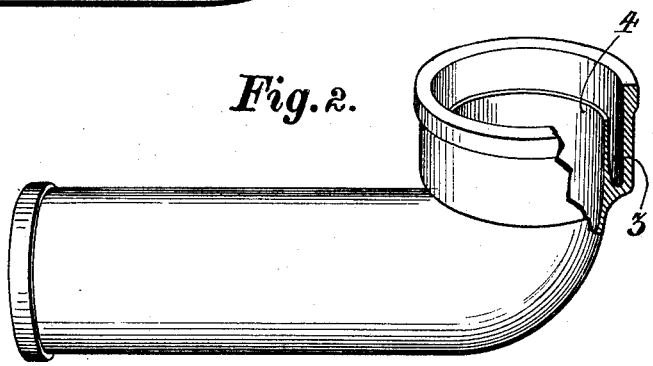
Figure 4:
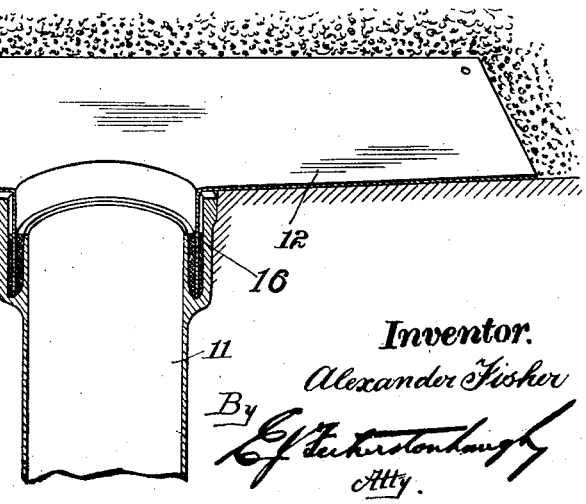

In the drawings, Figure 1 is a sectional perspective view of the waste pipe in position with connecting piece attached thereto and a bolt ready to be inserted in the flange of the connecting piece and showing a portion of the flooring. Fig. 2 is a perspective detail of the pipe showing the flange partially broken away. Fig. 3 is a perspective detail of the connecting piece partially broken away. Fig. 4 is a sectional perspective view of the connection as applied to waste pipes in roofs.

Like numerals of reference indicate corresponding parts in each figure.

Referring to the drawings, 1 is the pipe shown in Figs. 1 and 2 as having the upturned flanged end 2 formed with the internal annular recess 3, the inner wall 4 of said recess terminating intermediate of the length of said flanged end.

5 is a cylindrical piece extending into the annular recess 3 and having at its top end an outwardly projecting flange 6, said flange 6 having a downwardly projecting flange 7 at its outer edge and the arc-shaped slots 8 and the bolt head holes 9 at one end of said slots 8.

10 is a filling of lead in the annular recess 3 securing the connecting piece formed of the cylindrical piece 5 and the flange 6 to the pipe 1.

In Fig. 4, a modified form of the invention is shown, the cylindrical extension 16 of the roof plate 12 entering the annular recess and being held therein in the same way as shown in Fig. 1, the pipe 11 corresponding to the pipe 1.

13 is a bolt having the nut 14 on one end thereof and the head 15 at the other end.

In the use of this invention, and particularly in the form shown in Figs. 1, 2 and 3, the flange 6 is bolted to the vessel from which the waste matter comes. This is done simply by inserting the bolts in the slots through the bolt head holes and placing them in the proper position in said slots and bolting them to the base of the vessel, that part of the construction is not novel.

What I claim as my invention is:

In waste pipe connections, the combination with a flooring having a pipe hole therein, of a metallic connecting piece having a depending portion extending through said pipe hole and terminating at its upper end in an outwardly extending flange at right angles to said depending portion and resting on said flooring, a pipe length extending upwardly and terminating beneath the upper surface of said flooring and having a flange projecting outwardly and upwardly therefrom into and through said hole under the aforesaid flange forming an annular recess between the main pipe length and the vertical flange into which the aforesaid depending piece extends, and a substance filling said annular recess up to the top of said main pipe length.

Signed at the city and district of Montreal, Quebec, Canada, this 16th day of April, 1910.

ALEXANDER FISHER.

Witnesses:
  G. H. TRESIDDER,
  P. SHEE.

---

Copies of this patent may be obtained for five cents each, by addressing the "Commissioner of Patents, Washington, D. C."